Sept. 23, 1969     H. MASCHMANN     3,468,184
MOTION-TRANSMITTING MECHANISM WITH
MECHANICAL AMPLIFIER
Filed June 19, 1967     2 Sheets-Sheet 1
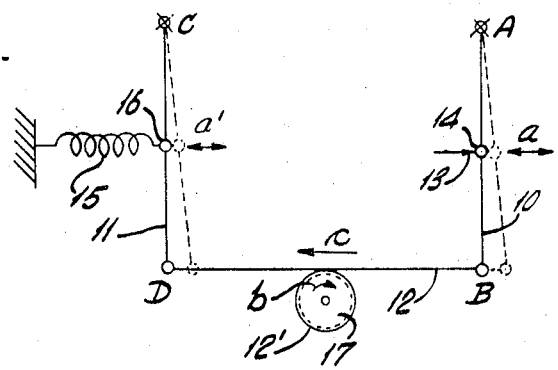
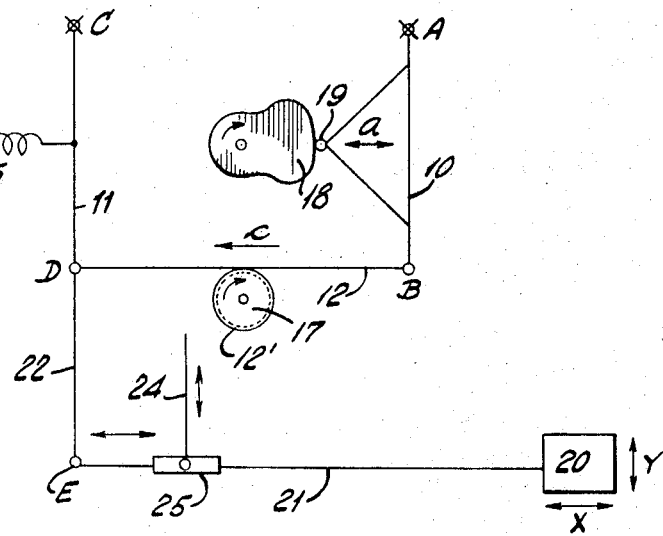
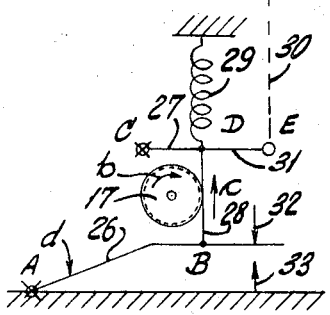
INVENTOR
HANS MASCHMANN
BY    KARL RATH
ATTORNEY Sept. 23, 1969  H. MASCHMANN  3,468,184
MOTION-TRANSMITTING MECHANISM WITH
MECHANICAL AMPLIFIER
Filed June 19, 1967  2 Sheets-Sheet 2
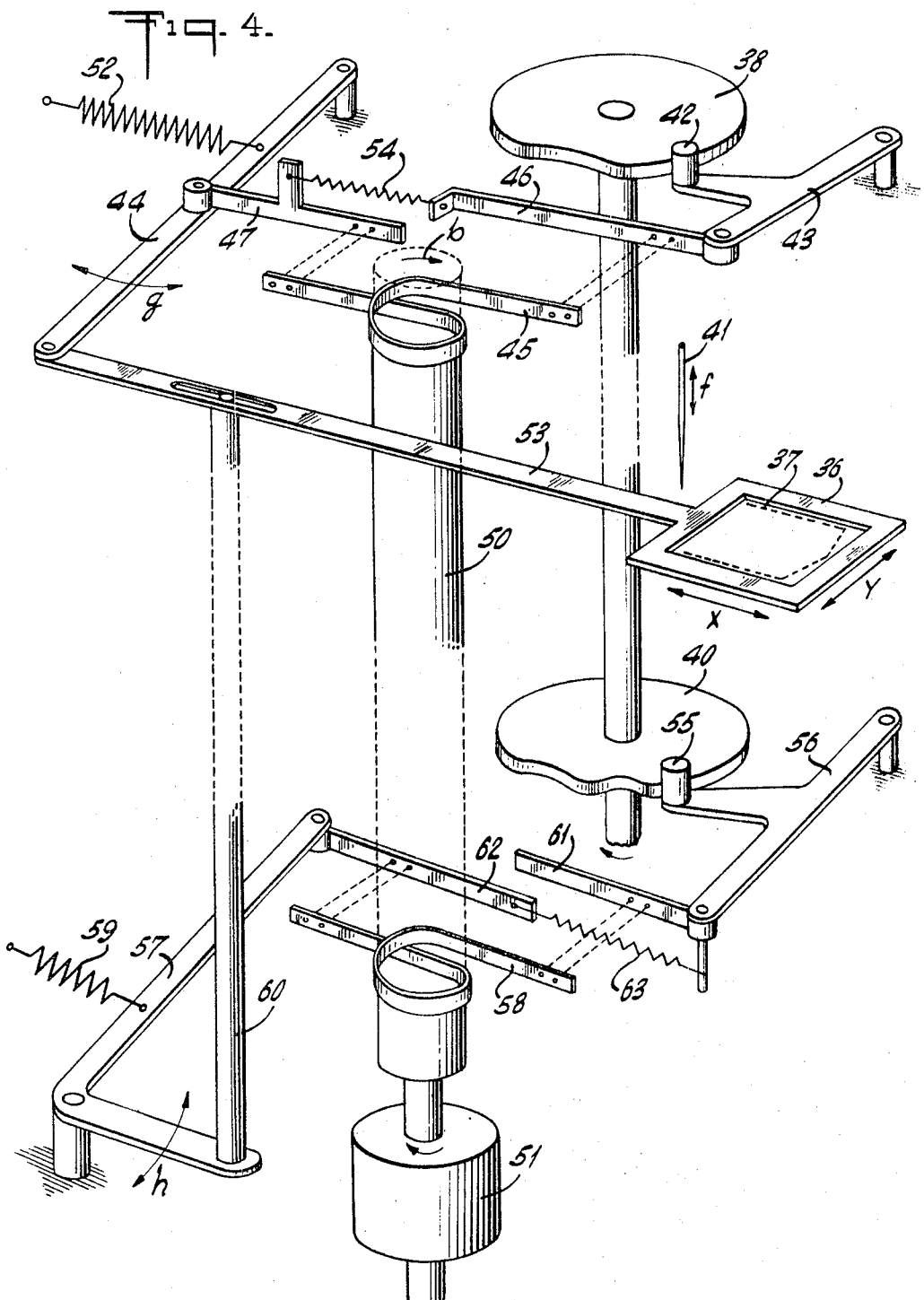
INVENTOR
HANS MASCHMANN
BY  KARL RATH
ATTORNEY United States Patent Office 3,468,184
Patented Sept. 23, 1969

3,468,184
MOTION-TRANSMITTING MECHANISM WITH MECHANICAL AMPLIFIER
Hans Maschmann, West Orange, N.J., assignor to G. M. Pfaff AG., Kaiserslautern, Pfalz, Germany, a corporation of Germany
Filed June 19, 1967, Ser. No. 646,870
Int. Cl. F16c *1/12;* G05g *1/00*
U.S. Cl. 74—501.5                                         9 Claims

ABSTRACT OF THE DISCLOSURE

In motion-transmitting mechanism including an intermediate link pivotally connected to a controlling lever and a controlled lever, respectively, the link consist of a flexible elastic tape having a portion thereof spirally wound around a rotary drum having a stationary axis. A return spring acting on the controlled lever and urging the tape in a predetermined direction enables the controlled lever to follow the deflections of the controlling lever, while the drum is rotated by an electric motor in a direction to frictionally engage and urge the tape in a direction opposite to said first direction.

---

The present invention relates to a mechanical power assist or amplifier, especially for use in conjunction with linkage-type power or motion-transmitting systems or mechanisms as used to transmit the control motion of an input lever element to a controlled lever or output element, for the operation or control of an output device or mechanism. The invention, while not limited thereto, is especially suited for use in connection with cam-controlled devices or transmission mechanisms, wherein a relatively small input or control force supplied by a cam follower is to result in a greater or amplified force applied to a controlled or output device. As a consequence, wear of the cam and follower elements will be greatly reduced or minimized and the construction of the transmitting mechanism greatly simplified. Considered from a general point of view, the invention may be employed with equal advantage for the power or motion transmission of any kind effected either automatically or manually. In the latter case, the burden and fatigue on the operator may be greatly reduced, aside from the attainment of other desirable and beneficial effects of both a practical and economic nature, as will become more apparent as the description proceeds.

Accordingly, an important object of the present invention is the provision of an improved mechanical power assist or amplifying device, especially designed for use in conjunction with linkage-type power or motion-transmitting systems, which is both simple in design and construction, as well as efficient and reliable in operation; which can be readily structurally embodied in existing control and power transmitting devices or systems; which is especially suited as a power assist in conjunction with cam-controlled power or motion-transmitting devices; and which will enable the displacement or operation of an output or small force applied either automatically or manually to an input or controlling element.

The invention, both as to the foregoing and ancillary objects as well as novel aspects thereof will be better understood from the following detailed description, taken in conjunction with the accompanying drawings forming part of this specification and in which:

FIG. 1 is a simplified basic diagram explanatory of the construction and operation of the invention;

FIG. 2 is a diagram similar to FIG. 1 and illustrating the invention as embodied in a cam-controlled motion-transmitting mechanism;

FIG. 3 is yet another diagram illustrating the invention as embodied in a motion-transmitting mechanism actuated by a foot pedal or the like control element; and FIG. 4 shows in greater detail and expanded representation an exemplary cam-controlled mechanism for the operation of a workpiece supporting frame, such as the sewing goods carrier of an automatic sewing machine.

Like reference characters denote like parts in the different views of the drawings.

With the foregoing objects in view, the mechanical amplifier of the invention structurally embodied in a follow-up type linkage motion-transmitting mechanism involves essentially the provision of a steel tape, or the like, elastic and flexible elongated member constituting an intermediate link of said mechanism with its opposite ends being operably connected with the input or controlling lever, on the one hand, and with the output or controlled lever on the other hand, of said mechanism. The return spring of the system, which may be of conventional design, is so arranged or positioned as to tension or bias said tape in a direction from its input end towards its output end of said mechanism. Besides, an intermediate portion of the tape is spirally wound upon a continuously rotating drum having a stationary axis and being driven by an electric motor providing the local power of the amplifier. Due to the tension imparted upon the tape by said spring, or the like, biasing means of the mechanism, the tape is maintained in continuous frictional engagement with said drum which is rotated to urge the tape in a direction opposite to the tension imparted to the tape by said spring. In other words, while the bias spring of the mechanism exerts a force on the tape urging the same towards the output end, the rotating drum constituting a friction drive tends to urge the tape in the opposite direction or towards the input end of the mechanism. As a consequence, variations of the spring tension caused by the displacement of the controlling lever result in a change of the friction coupling force between the tape and drum, followed by a proportional control of the power applied by the motor, in such a manner as to afford a substantially effortless displacement or control by said lever, to effect a corresponding control or displacement of the controlled lever for the operation of an output device, in a manner as will become further apparent as the description proceeds in reference to the drawings.

The invention is especially suitable for use in connection with cam-controlled transmission mechanism, wherein an output device, such as a workpiece supporting frame or carrier, is to be displaced in accordance with the contour configuration of one or more control cams. In the latter case, the controlling lever of the transmission mechanism is displaced by the cam follower acting as a control element and maintained in continuous contact engagement with the cam by the action of the return or biasing spring of the mechanism which also serves to bias or tension the tape of the power assist or amplifier. In arrangements of this type, the use of the power assist or amplifier according to the invention substantially reduces wear on the cam or cams, thus maintaining and ensuring the accuracy and reliability of the control over prolonged periods, aside from other obvious advantages and desirable results of both a technical and economic nature.

Referring more particularly to FIG. 1, there is shown a basic diagram of a simple parallelogram-type motion-transmitting mechanism embodying a power amplifier constructed in accordance with the principles of the invention, said mechanism comprising a first or controlling lever 10 having one end thereof forming a fixed pivot A and having its freely movable opposite end B linked to a further or controlled lever 11 having a fixed pivot C and a freely movable end D, both said free ends B and D being pivotally connected to the ends of an intermediate link 12. With the lever 10 forming the input or controlling element and with the lever 11 forming the output or controlled element of the system, the latter is continuously urged into resilient engagement with a stop or abutment 13 engaging a point 14 of the lever 10 by the action of a return tension spring 15 or the like biasing element acting on point 16 of the lever 11 in the example illustrated.

In mechanism of the afore-described type, displacement of the input point 14 manually or by a suitable control element 13 (foot pedal, cam-follower, etc.) in either direction, as indicated by the double arrow *a*, causes a similar displacement of the output point 16, as indicated by the double arrow *a'*, by virtue of the continuous follow-up movements of the levers 10 and 11 due to the action of the spring 15 or equivalent biasing device.

According to the improvement forming the subject of the present invention, the intermediate link 12, forming a part of the mechanical amplifier or power assist, is constituted by an elastic steel tape or an equivalent elongated flexible and elastic elongated member having its opposite ends articulated or pivotally connected to the levers 10 and 11 and having an intermediate portion 12' spirally wound upon a drum 17 which is continuously rotated in the direction of the arrow *b* by an electric motor (not shown) constituting the local power source of the amplifier. As a consequence, the tap 12 is tensioned by the spring 15 or urged in the direction of the arrow *c*, that is, towards the output end of the system, whereby to be tightly wound upon the drum 17 and to provide a friction drive for the tape by the drum 17.

More specifically, while, in the example illustrated, the spring 15 urges the tape 12 towards the left or in the direction of the output end of the mechanism, as indicated by the arrow *c*, the drum 17 tending to drive the tape rotates in such a direction, as indicated by the arrow *b*, as to urge the tape towards the right or in the direction of the input end of the mechanism.

In operation, as the input or control element 13 is displaced towards the right in the direction of the arrow *a*, the mechanism by assuming a position as indicated in dashed lines causes an increased tension by the spring 15 which, in turn, acts to tighten the tape 12 upon the drum 17 and to increase the friction coupling force between the tape and the drum. As a consequence, the increased driving force on the tape acts to assist the displacement of the member 13, thereby greatly reducing or minimizing the control effort or force required by the driving motor acting as a local power assist in overcoming the increased spring tension and friction resistance imposed by the mechanism and the output or controlled device being operated thereby.

The system is most sensitive if the friction driving force on the tape by the drum 17 just sufficiently overbalances the tension of the spring 15, to ensure a close and continuous follow-up contact between the control element 13 and the input point 14 on lever 10. In practice, the spring tension may exceed the friction drive to a greater extent in the interest of ensuring an adequate operating stability, while providing a sufficient power boost or amplification by the motor or local power source.

During the movement of the control member 13 in the opposite or reverse direction, that is, towards the left in the example described, the operating power is supplied by the elastic energy stored in the spring 15, whereby to enable the attainment of a practically effortless control or operation of a controlled device coupled with the controlled lever 11 of the mechanism.

FIG. 2 diagrammatically shows a mechanical amplifier according to the invention operably associated with a cam-controlled output device, such as the workpiece tentering frame of an automatic sewing machine for the sewing of a design or pattern in accordance with the configuration of a pair of cams controlling the displacement of the frame or the like workpiece carrier in both the *x* and *y*-coordinate directions, in a manner well known to those skilled in the art. There is shown for this purpose in FIG. 2 a cam 18 cooperating with a roller or cam follower 19 affixed to the controlling lever 10 of a mechanism similar to that according to FIG. 1, to effect input or control displacements in the directions of the arrow *a*, and to displace the frame 20 in the *x*-direction. To this end, the latter is connected to the end of a link 21 which is in turn linked at its opposite end E to an extension 22 of the controlled lever 11. The power amplifier comprised of the flexible link or tape 12 and drum 17 is substantially the same as described in reference to FIG. 1.

A similar control cam and transmitting mechanism (not shown) may be provided for the displacement of the link 21 and frame 20 in the *y*-direction, only the output link 24 of the additional mechanism and its slidable (lost-motion) connection 25 with the link 21 being indicated in the drawing for simplicity of illustration.

For further illustration of the invention, FIG. 3 shows in diagrammatic form mechanism for the operation of a controlled device, such for instance as the work presser foot of a sewing machine, by means of a foot pedal 26 and pull chain 30, in the example shown. The pedal 26 being pivoted at A forms the controlling lever of a linkage mechanism being of the type according to the preceding figures and further comprising a controlled lever 27 and an elastic tape 28 forming an intermediate link and being wound upon a rotating drum 17, lever 27 serving to operate the chain 30 through an extension 31 in substantially the same manner as the lever 11 of FIG. 2. The mechanism is normally urged to a position of engagement of the pedal 26 with a first stationary abutment 32 by the action of a return spring 29. As a consequence, depression of the pedal by a relatively slight pressure applied in the direction of the arrow *d* and to a point with the pedal engaging the cooperating stop or abutment 33, will result in an amplified pull or force on the chain 30 in the direction of the arrow *e*. As a consequence, the operator will be greatly relieved in the operation of the pressure foot or any other output devices being controlled by chain 30.

Referring to FIG. 4 there is shown in greater detail an exploded representation control mechanism for the operation of a workpiece carrier in the form of a sewing goods tentering frame 36 serving to support a fabric to be sewn along a predetermined path or pattern 37, representing a clothes pocket in the example illustrated. The sewing path may have any shape or configuration, the latter being composed in a known manner of the incremental displacements of the frame 36 in the *x* and *y*-directions as determined, respectively, by the configurations of a pair of control cams 38 and 40, in a manner well known in the design and operation of automatic workpiece control apparatus of this type. Item 41 indicates the needle of the sewing machine reciprocable in the vertical direction, as indicated by the arrow *f* in the drawing. As will be understood, frame 36 may be replaced by any other workpiece carrier cooperating with a suitable tool or processing device.

Cam 38 serving to control the displacement of the frame 36 in the *x*-direction cooperates with a roller or cam follower 42 carried by the controlling lever 43 of the parallelogram-type transmitting mechanism which furthermore comprises a controlled lever 44 and an intermediate link in the form of an elastic steel band or tape 45 forming part of the power amplifier according to the invention. In the example shown in the drawing, the tape 45 has its opposite end affixed, by way of rivets or in any other suitable manner, to a pair of auxiliary links 46 and 47 pivotally connected to the levers 43 and 44, respectively. The intermediate portion of the tape 45 is wound with single spiral turn upon an elongated drum or arbor 50, the latter being continuously driven by the local power source shown in the form of an electric motor 51. Item 52 denotes the return spring of the mechanism and 53 the output link connected to the controlled lever and which serves to drive the frame 36 in substantially the same manner as shown by and described in reference to FIG. 2.

While the bias or normal tension of the tape 45 may be controlled by adjusting the tension of the return spring 52, it is advisable to provide for a separate or fine adjustment by the provision of an auxiliary tensioning or adjusting spring 54 connecected between the auxiliary links 46 and 47.

The mechanism for displacing the frame 36 in the y-direction by the cam 40 is substantially similar, comprising a cam follower 55, controlling ever 56, tape 58 and controlled lever 57, the latter being linked, through an auxiliary connecting link 60, to an intermediate point of the link 53 driving the frame 36. As a consequence, the frame is displaced in tne x-direction, in accordance with the configuration of the cam 38, by the deflection of the lever 44 as indicated by the double arrow g, on the one hand, and in the y-direction, in accordance with the configuration of the cam 40, by the deflection of lever 57, as indicated by the double arrow h, on the other hand.

In the example shown, the tape 58 of the mechanism for effecting the displacement in the y-coordinate is connected to auxiliary links 61 and 62 and wound upon the common drum 50, in substantially the same manner as the tape of the mechanism for effecting of the displacement in the x-coordinate. The adjusting spring 63 corresponds to the spring 54 and the return spring 59 corresponds to the spring 52.

Where a single drum 50 is employed for both amplifiers of the x and y control mechanisms, as shown in FIG. 4, the effects of both amplifiers are more or less equalized or dependent upon one another. This, however, does not constitute any disadvantage, since the amplifier according to the invention functions substantially as a power assist with the actual displacement of the controlled lever being predetermined by the transmission mechanism. In other words, the displacement of point 16 of the controlled lever of FIG. 1 in relation to the displacement of point 14 of the controlling lever is determined by the levers 10, 11 and 12 and independent of the force or power assist provided by the amplifier 12, 17.

The cams 38 and 40 mounted upon a common shaft may be rotated in any suitable manner and at a desired speed relative to the operation of the sewing machine, in manner understood and known to those skilled in the art.

As is well known, assuming a proper shape or contour of the cams 38 and 40, any composite incremental displacement may be achieved of the frame 36 or the like output device, to result in a final operating path or pattern of desired configuration, such as the pocket seam 37 shown for illustration.

In the foregoing the invention has been described in reference to a specific illustrative device. It will be evident, however, that variations and modifications, as well as the substitution of equivalent parts or elements for those shown for illustration, may be made without departing from the broader scope and spirit of the invention. The specification and drawings are accordingly to be regarded in an illustrative rather than in a restrictive sense.

I claim:
1. Motion-transmitting mechanism comprising in combination:
 (1) a controlling lever,
 (2) a controlled level adapted to operate a controlled device,
 (3) a rotary drum having a stationary axis,
 (4) a driving motor to rotate said drum,
 (5) an elongated elastic flexible member forming an intermediate link operably connecting said controlling and controlled levers and having a portion spirally wound around said drum, and
 (6) return spring means arranged to urge said member in a direction to enable deflection of said controlled lever in accordance with the deflections of said controlling lever,
 (7) said drum rotating in a direction to frictionally engage and urge said member in a direction opposite to said first direction,
 (8) whereby to cause said motor to supply the deflecting force of said controlling lever against the action of said spring means.

2. Motion-transmitting mechanism as claimed in claim 1, including a rotating control cam and a cam-follower therefor carried by said controlling lever.

3. In motion-transmitting mechanism as claimed in claim 1, said flexible member consisting of a steel tape wound with a single spiral turn engaging said drum.

4. In motion-transmitting mechanism as claimed in claim 1, said controlling lever, said controlled lever, and said intermediate link forming a parallelogram-type linkage mechanism.

5. Motion-transmitting mechanism as claimed in claim 1, including a pair of auxiliary rigid links, one of said auxiliary links having an end pivotally connected to said controlling lever and the other auxiliary link having an end pivotally connected to said controlled lever, and means rigidly connecting said flexible member to said auxiliary links.

6. In motion-transmitting mechanism as claimed in claim 5, including a further tension spring connected between said auxiliary links.

7. Motion-transmitting mechanism comprising in combination:
 (1) a controlling lever,
 (2) a displaceable control element to deflect said lever,
 (3) a controlled lever adapted to operate a controlled device,
 (4) a rotary drum having a stationary axis,
 (5) a driving motor to rotate said drum,
 (6) an intermediate link in the form of a flexible elastic tape having its ends pivotally connected to said levers and having a portion spirally wound around said drum, and
 (7) return spring means acting upon said controlled level, to urge said tape in a direction to maintain a continuous resilient engagement between said controlling element and said controlling lever,
 (8) said drum rotating in a direction to frictionally engage and urge said tape in a direction opposite to said first direction,
 (9) whereby to cause said motor to supply the deflecting force for said controlling lever against the action of said spring means.

8. In a motion-transmitting mechanism as claimed in claim 7, said tape consisting of steel and wound in a single turn about said drum.

9. In a motion-transmitting mechanism as claimed in claim 7, said control element consisting of a rotating cam follower, and a control cam cooperating with said follower.

References Cited

UNITED STATES PATENTS

| 328,678 | 10/1885 | Hogsett | 74—108 |
| 1,405,852 | 2/1922 | Maag | 74—108 |
| 2,690,082 | 9/1954 | Orcutt | 74—108 X |
| 2,972,264 | 2/1961 | Birkbeck et al. | 74—592 |
| 3,335,620 | 8/1967 | Vertut | 74—108 |
| 3,358,626 | 12/1967 | Bryan. | |

FRED C. MATTERN, JR., Primary Examiner

C. F. GREEN, Assistant Examiner

U.S. Cl. X.R.

74—501, 599; 112—2